Nov. 20, 1934.  G. I. GOODWIN  1,981,504
ADJUSTABLE CLUTCH MECHANISM
Filed June 20, 1931    3 Sheets-Sheet 3
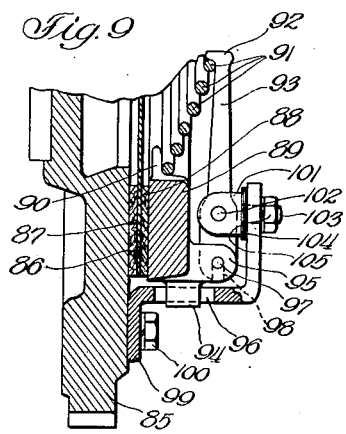
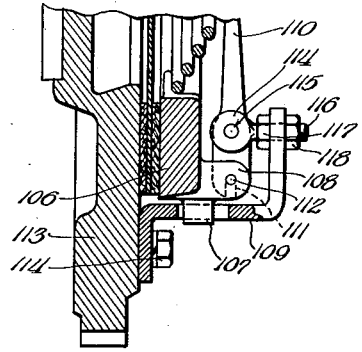
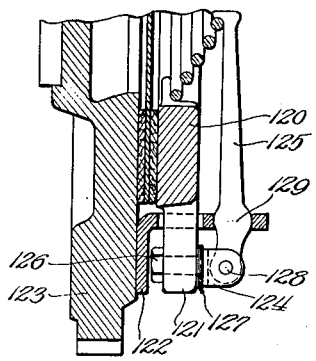
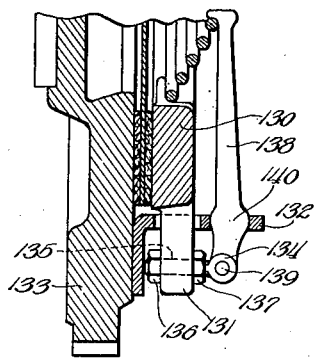
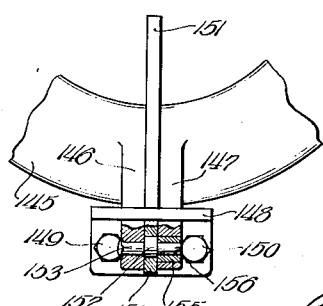
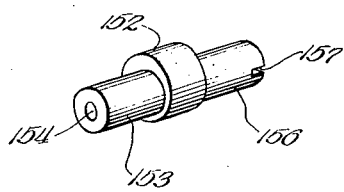
Inventor:
George I. Goodwin Patented Nov. 20, 1934

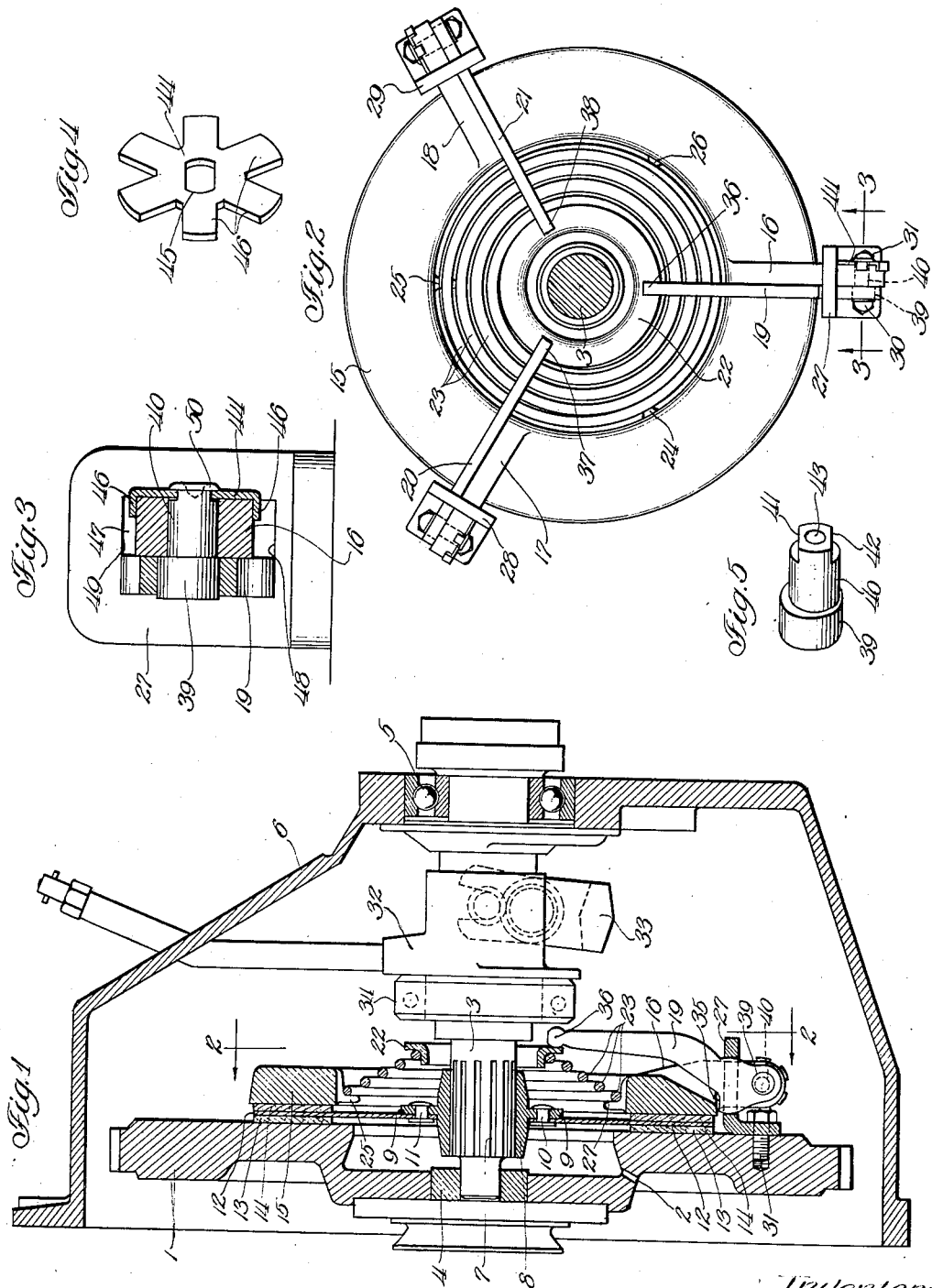

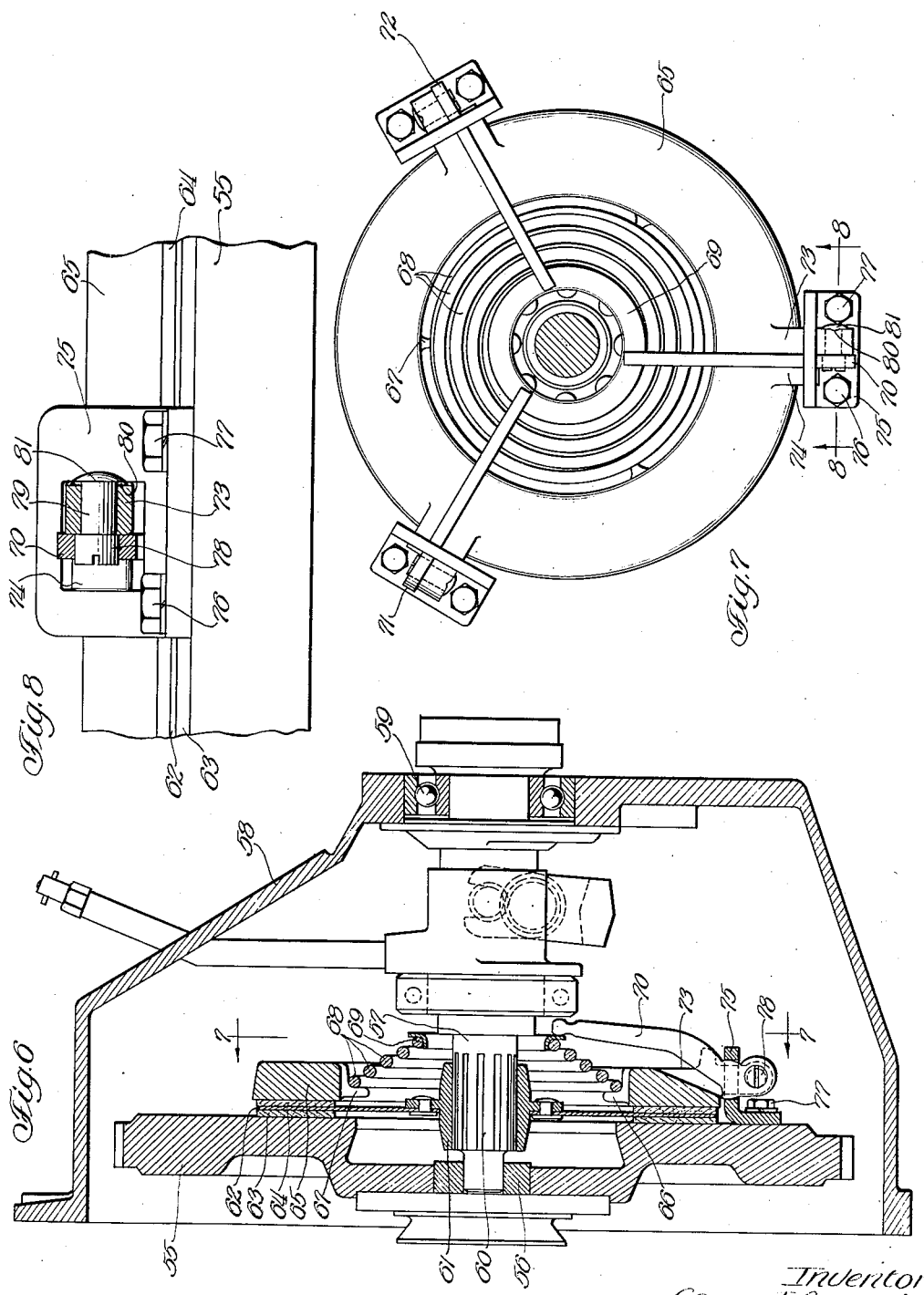

1,981,504

UNITED STATES PATENT OFFICE 1,981,504

ADJUSTABLE CLUTCH MECHANISM

George I. Goodwin, Detroit, Mich.

Application June 20, 1931, Serial No. 545,723

14 Claims. (Cl. 192—110)

This invention relates to clutches in general, and is particularly concerned with novel and improved clutch mechanisms, having means for adjusting the parallelism of lever operation.

Speaking in general, a clutch such as is contemplated in this invention may be defined as a mechanism for permitting the coupling and uncoupling of a driven member relative to a driving member. The driving member may be the fly-wheel of an engine and the driven member may be a shaft. This shaft may extend, e. g., in case of an automobile, to a transmission system. In case of other machinery, the driven shaft may be arranged to cooperate with operating mechanisms, either directly or through the intermediary of a special gear arrangement or the like.

The driven shaft may be journaled in bearings, one disposed in the fly-wheel and the other in the so-called bell housing. The driven shaft is thus arranged rotatively in coaxial extension of the fly-wheel. A portion of the driven shaft may be provided with splines, and a flanged hub, or bushing member may be disposed on said splined portion to be axially movable thereon and rotatable with the driven shaft. This flanged hub or bushing may support a driven plate carrying on its outer portion friction members. The friction members may be brought into frictional driving engagement with a friction surface on the fly-wheel and with a friction surface on a movable pressure plate, respectively.

The mechanism for moving the pressure plate toward the driven plate, in the direction of clutch engagement, and away from the driven plate during the clutch disengaging operation may comprise a number of levers arranged on the pressure plate substantially radially thereto; spring means or the like disposed between the levers and the pressure plate tending to force the levers outwardly away from the pressure plate; abutment members cooperating with the fly-wheel and with the levers and serving as reaction bases for the levers in either direction of movement thereof; and a thrust, or throw-out bearing mounted movably on a sleeve surrounding the driven shaft.

When this mechanism is assembled on the fly-wheel, the levers will be moved outwardly away from the pressure plate, due to the action of the spring means, and will react against the abutments which are fastened on the fly-wheel, thereby pressing the pressure plate against the friction member on the driven plate, forcing the driven plate into frictional driving engagement with the fly-wheel. When disengagement of the clutch is desired, the thrust, or throw-out bearing will be operated to engage the inner ends of the levers and to depress the same against the force of the spring means. The levers will find reaction bases in the corresponding abutments and will lift the pressure plate off from the driven plate, thereby releasing the driven plate and disengaging the same from driving relation with the fly-wheel.

Recalling now the type of clutch which I have in mind, in accordance with the general discussion rendered in the foregoing, it may be said that the satisfactory functioning of such a clutch, and of other clutches which belong to the same general class, depends largely upon the parallel movement of the pressure plate during clutch engagement. If this is to be true, the thrust or throw-out bearing must engage the levers at the same time for effecting the clutch disengagement. The lever system which I have provided is of the closed link type, wherein individual movement of the levers is prevented. This assists in achieving the parallelism of operation of the mechanism, but as will be apparent later, it is not the sole provision by which such parallelism can be accomplished.

It will be remembered that the clutch mechanism proper i. e., the pressure plate and cooperating parts, are attached to the fly-wheel. Now, there are structures known, showing means for adjusting the clutch mechanism after the same is applied to the fly-wheel. However, these adjusting provisions do not operate satisfactorily because variations of other parts, such as the driven plate and its friction members, enter the problem and make the result of adjustment illusory.

No adjusting provisions would be necessary in a case in which no manufacturing variations occur in any of the parts comprised in a clutch mechanism. If all the different parts, such as the pressure plate, the driven plate, the levers, the abutments and the reaction surfaces, and also the places where the levers are mounted in the pressure plate or on extensions of the pressure plate, were made exactly to specification without any manufacturing variations whatsoever, adjusting provisions would be superfluous, the parallelism of action would be achieved. Such a case, however, is impossible in practice since manufacturing variations will always occur even if these variations are very small due to the modern processes of manufacture. It will be readily understood that variations occurring in various cooperating parts will have a cumulative effect so that in practice it is impossible to furnish a clutch in which the parallelism of operation is accomplished without any special provision which takes these variations into account. The provisions which have been suggested in the past for achieving this parallelism of action are concerned with adjustments which must be made after the clutch is applied to the fly-wheel.

It is the principal purpose and aim of my present invention to correct the error resulting from manufacturing variations of the various parts of a clutch mechanism as discussed above.

I have shown various embodiments of my invention and shall presently describe these embodiments in detail. However, a more general description preceding the detailed description will assist a correct understanding of the invention and I shall therefore briefly review the various embodiments before entering the detailed discussion.

In one embodiment I show the invention applied to a clutch mechanism in cooperation with a pressure plate having a number of lateral extensions, one for each lever. The pivot pin for mounting each lever on the corresponding extension is eccentric. It comprises a large portion on which the lever is journaled, and a small portion which extends through a hole in the pressure plate extension. The degree of eccentricity of the smaller portion of this pin or stud relative to the larger portion need only be about .002". It will be understood, therefore, that the pivot point of each lever may be altered or adjusted by simply rotating the eccentric pin in the extension of the pressure plate. A lock washer is used for locking the pin in place after proper adjustment, and the end of the pin is riveted over, securing the assembly in position.

It may be mentioned in this connection that the eccentric throw of the pin or stud is so small as compared to the pin diameter that there will be little or no tendency for the pin to turn. Such tendency will also be resisted by the lock washer and by the riveted end of the pin which clamps the pin in place.

In another embodiment I have shown the invention applied to a clutch mechanism having a pressure plate which is provided with pairs of lugs or extensions which project laterally from the pressure plate to act in a driving capacity in connection with the sides of a corresponding opening in each abutment bracket cooperating with the corresponding extension. In the first described case is shown a pressure plate having single extensions on which the levers are mounted movably by means of eccentric pins or studs. In this second embodiment I have two lugs or extensions on the pressure plate for each lever, the advantage being a better possible fit between the lugs and the abutment brackets. One of the lugs or extensions is shorter than the other. The shorter lug or extension merely extends through the abutment bracket far enough to serve as a driving means, while the long extension projects through the bracket as in the previously discussed structure and serves as a fulcrum mounting for the lever. In other words the lever is pivotally secured to the longer extension of the pressure plate by means of an eccentric pin. A groove is provided in the extension of the pressure plate and the smaller end of the corresponding pin or stud is riveted over after the adjustment has been made, the metal flowing into the groove and acting as a key for holding the eccentric pin in position. This groove is cast all the way across the extension of the pressure plate and in a direction so as to permit the casting to be made without a core.

In another embodiment I have shown means for adjusting the parallelism by means of shims. An abutment cooperates with each lever and with the pressure plate and this abutment is shaped to overlie the pressure plate. An extension on the pressure plate projects into a hole on the abutment, acting as a driving means. On the end of each abutment bracket is mounted a lug having a threaded end which extends through the abutment bracket and may be attached by means of a nut. Shims may be interposed in order to facilitate the adjustment of the lug relative to the abutment bracket, thereby changing the position of the lever. This lug serves as a reaction base for the corresponding lever in either direction of movement thereof.

In a further embodiment I show the same form of abutment bracket as is used with the last described embodiment but employ a lug, for serving as a reaction member for the corresponding lever, which may be adjusted relative to the abutment bracket by means of nuts, the mounting being accomplished by placing the abutment bracket intermediate of the nuts which engage the threaded portion of the adjustment lug.

In another embodiment I show a pressure plate having lateral extensions, one for each lever, and mounted on each extension is a fulcrum lug for pivotally securing the corresponding lever. This fulcrum lug may be adjusted by means of shims. The abutment bracket has two openings, one for receiving the extension on the pressure plate, which also acts as a driving means, and the other opening for receiving the lever and for furnishing the requisite reaction surfaces for the lever in either direction of movement thereof.

Still another embodiment shows a modification of the structure described in the preceding paragraph but using a fulcrum lug, in connection with each of the extensions of the pressure plate, which may be adjusted by means of nuts in its position relative to the extension of the pressure plate.

In a further embodiment I have shown a structure in which the pressure plate is provided with two laterial extensions, of equal length, for each lever, and a mounting pin for the corresponding lever which is enlarged in its central portion. This enlarged central portion is also eccentric relative to the end portions of the pin.

Each of the embodiments generally described above presents the possibility of individually adjusting each lever by simple means. Manufacturing variations of the various parts cooperating in the clutch are thereby taken care of and a parallelism is secured which makes it possible to achieve an efficient and accurate operation of the clutch.

One of the important features of my invention resides in the fact that the adjustment for parallelism can be made, and can be locked in place, in the shop where the clutch is manufactured. The advantage of this possibility will be realized at once when it its considered that no adjustment need be made at the time when the clutch is mounted in a car. The adjusted clutch is simply put in place for operation.

Another important feature of a structural nature of my invention resides in the adjustment for parallelism which is made between the pressure plate and the lever.

As a further feature of novelty I desire to mention the use of an eccentric fulcrum pin for accomplishing the adjustment for parallelism.

Now, in order to teach others how the invention may be applied in practice, I shall describe the same with reference to the accompanying drawings in which I have shown several embodiments of the invention. In these drawings:

Figure 1 shows a cross sectional side view through a clutch mechanism embodying my invention;

Figure 2 is a top view of the mechanism shown in Figure 1, taken on lines 2—2 in Figure 1, with certain parts omitted for the sake of clarity;

Figure 3 illustrates an enlarged cross sectional end view taken on line 3—3 of Figure 2;

Figure 4 shows the lock washer for securing the eccentric adjustment pin in the embodiment illustrated in the Figures 1–3;

Figure 5 is a perspective view of the eccentric adjustment pin which is used in the clutch mechanism shown in Figures 1 to 3;

Figure 6 represents a cross sectional side view of a clutch mechanism, similar to the view shown in Figure 1, showing the means for adjusting the parallelism of lever operation as applied to a mechanism having a pressure plate provided with pairs of lugs or extensions for the corresponding levers, wherein one of the extensions or lugs of each pair is shorter than the other;

Figure 7 is a top view of the clutch mechanism taken on lines 7—7 in Figure 6, with several parts omitted in order to keep the drawing as clear as possible;

Figure 8 is an enlarged end view of the mechanism taken on lines 8—8 of Figure 7 and showing certain parts in cross section and others in elevation;

Figure 9 is a fragmentary section through another embodiment of the invention, applied in this case to a pressure plate having laterally extending driving projections and axially extending fulcrum lugs for the various levers. The means for adjusting the parallelism is in this case combined with abutment brackets and the adjustment is taken care of by means of shims;

Figure 10 is a fragmentary view similar to the view shown in Figure 9 and illustrates an embodiment in which the adjustment for parallelism is also combined with the abutment bracket but dispensing with the necessity of shims;

Figure 11 is another fragmentary view of an embodiment in which the levers are fulcrumed in lugs attached to the pressure plate, the adjustment for parallelism being accomplished by means of shims;

Figure 12 is a further embodiment of the invention corresponding somewhat to the embodiment shown in Figure 11 wherein the necessity for shims is dispensed with, the adjustment of the fulcrum lugs being accomplished by means of nuts;

Figure 13 is the fragmentary view of an embodiment of my invention in connection with a pressure plate having pairs of lugs or extensions of equal length, showing how the adjustment for parallelism may be made by means of eccentric pins; and Figure 14 is a perspective view of the eccentric pin which may be employed in connection with the embodiment shown in Figure 13.

Referring now to the embodiment shown in the Figures 1, 2 and 3, the fly-wheel is designated in these figures by the reference numeral 1. The fly-wheel may be relieved in such a manner as to prevent the entry of oil to the friction surfaces of the clutch. A scoop such as designated by the numeral 2 may be provided for this purpose and the oil thrown out from the pilot bearing will be discharged through this scoop. This fly-wheel 1 may be carried by an engine crank shaft and represents the driving member which is to be coupled in driving relation with a driven member. This driven member may be the shaft 3. This shaft is journaled in a bearing in the fly-wheel 1 which is diagrammatically indicated at 4. The other end of the shaft 3 is journaled in the bearing 5 mounted in the bell housing 6. The shaft 3 may extend to a transmission system or the like. A portion of the shaft 3 is provided with splines as is indicated at 7. Attached to this splined portion 7 of the shaft and axially movable thereon is a hub or bushing 8 which is provided with a flange 9. Fastened to this flange 9 of the hub or bushing 8 by means of rivets such as 10 and 11 is a driven plate or disc 12 which may be of the flexible type. The outer portion of this disc 12 is provided with friction members such as 13 and 14.

The clutch operating mechanism comprises a pressure plate 15 which may be of cast material and provided with integral extensions such as 16, 17 and 18. On each of these extensions is mounted a lever as is indicated at 19, 20 and 21. The manner of mounting these levers on the corresponding extensions will be described presently. These levers extend substantially radially of the pressure plate toward the center thereof and the inner ends of these levers engage a collar 22 which closes one end of the coiled spring 23. It may be mentioned at this point that the levers need not extend radially toward the center of the clutch but might be turned thru an angle, depending upon the type of thrust or throwout bearing which is used. The other end of the spring 23 is mounted on extensions such as 24, 25, 26, 27 projecting toward the center from the pressure plate 15. Each lever cooperates within an abutment bracket as is indicated at 27, 28 and 29. Each of these brackets is mounted on the fly-wheel 1 by means of bolts such as 30 and 31 and is provided with an opening through which the corresponding pressure plate extension and the lever mounted thereon project. This opening in the bracket furnishes reaction bases for the corresponding lever in either direction of movement thereof.

It will be understood from the above description with reference to the Figures 1 to 3 inclusive, that the tendency of the spring 23 to expand will cause the levers to move outwardly, away from the clutch mechanism. When these levers move in this manner, they will find reaction bases in the corresponding brackets which are fastened to the fly-wheel and, since each lever is fulcrumed in the pressure plate, or rather to say in the corresponding extension of the pressure plate, it will be apparent that the movement of the levers due to the spring force will cause depression of the pressure plate 15 against the friction member 14 on the driven plate 12. Accordingly, the friction member 13 of the driven plate 12 will be pressed into contact with the friction surface on the fly-wheel. The mechanism will be substantially in the position as shown in Figure 1. Direct driving relation between the driving member 1 and the driven member 3 is now established, the driving force from the fly-wheel 1 is transmitted directly to the driven shaft 3 by way of the friction member 13, driven plate 12, bushing 8, and splines 7 on the driven shaft 3.

In case disengagement of the clutch is desired, the thrust or throwout bearing which I have diagrammatically indicated at 32 will be moved by means of the bracket lever mechanism 33 and the thrust bearing proper 34 will engage the inner ends of the levers 19, 20 and 21. These levers will be depressed against the force of the spring 23 and will find reaction bases in the corresponding abutment brackets. Accordingly, the pressure plate 15 will be lifted out and off from engagement with the friction member 14 on the driven disk 12 and the driven disk 12 will therefore be released from driving engagement with the fly-wheel 1. The hub or bushing 8 will now float on the splined section 7 of the driven shaft 3. The clutch is disengaged.

Before entering into a discussion of the provision for adjusting the parallelism of the above described clutch mechanism, I desire to call attention to various features which are inherent in this clutch mechanism.

This clutch is an open or coverless type of clutch and the entire assembly, including all parts, is designed so as to promote the radiation of heat away from the clutch. The operation of the clutch is so that the production of excessive heat is prevented by the fact that all parts cooperate so as to furnish a more definite action than may be found in the customary clutch mechanism. In connection with the problem of heat radiation it may be mentioned that the spring 23 is mounted on the pressure plate in such a manner as to reduce the area of contact between the spring and the pressure plate, thereby also reducing the heat transfer between these parts. Heat transmission from one part to the other is prevented while heat radiation is promoted. It is understood, of course, that special cooling means such as louvers, fins, blades, or the like may be provided if desired.

I have shown one coiled spring for operating this clutch. Modifications are of course possible. For example, instead of having one single coiled spring, compound springs may be used or individual springs for each of the levers may be employed. The form and shape of these springs and the various combinations of springs that are possible are not described in detail in this specification as this feature of the invention is not intended to be claimed herein.

The spring in this embodiment is shown to be mounted directly on the extensions which project from the inner portion of the pressure plate 15. As an alternative, brackets may be provided which may be attached to the fly-wheel and overlie the pressure plate, providing flexible mountings or rests for supporting the spring.

The collar 22 may be dispensed with if desired and the inner ends of the levers may directly contact with the spring. The use of the collar 22 obviates accurate grinding and finishing of the end of the spring.

The fulcrum points of the levers are placed within the actual cast part of the pressure plate. The extensions projecting from the pressure plate laterally thereto are, as will be remembered, integral cast parts of the pressure plate.

The levers which are used are of the single type and each lever is made from a single thickness of stock and adapted to be stamped out in close approximation to a finished product requiring a minimum amount of machine work.

The wearing surfaces of the levers and also the reaction bases of the abutments may be hardened in order to furnish the desired durability.

Various modifications of the arrangement of levers on the pressure plates may be devised. For example, it is possible to use compound levers instead of the single levers which I have shown. A secondary lever may cooperate with each of the primary levers shown, and the fulcrum for the secondary levers may be on the pressure plate. Each secondary lever may engage the spring at one end and at the other end react against the corresponding primary lever.

The levers are of the closed link type, that is to say, the independent movement of these levers is prevented. The levers move in unison furnishing positive action of the clutch mechanism.

Attention is also called to the unusual length of the levers as compared with levers found in current clutch structures. This length of the levers cuts down the angle of travel required of the levers for any given or required linear movement of the clutch parts.

In the clutch structure described with reference to Figures 1, 2 and 3, it will be seen that I have provided a simple bracket type of abutment. Shims may be used in connection with these abutments in order to permit wear compensating adjustments of the wearing surfaces of the abutments relative to the levers.

Instead of using this angle type of abutment, the structure may be modified to employ abutment posts. That is to say, abutment posts may be used which may be attached adjustably to the fly-wheel by means of a suitable clamp attachment which permits the use of shims, these abutment posts extending partially or totally through suitable openings in the pressure plate or in the extensions of the pressure plate and providing reaction surfaces for the levers.

If it is desired, separate driving means may be employed. In the construction described, I have shown that the extensions or lugs on the pressure plate also serve at the same time as driving means taking the drive from the edges of the openings in the abutment brackets through which the extensions of the pressure plate project. In case of a structure which utilizes separate driving posts, the pressure plate may be provided with additional extensions intermediate of the extensions for the levers, and these intermediate extensions may cooperate with suitable driving pins attached to the fly-wheel.

In case it is desired to use this clutch mechanism or any modification thereof in conjunction with a plain thrust or throwout bearing, the mechanism may be modified by combining the collar, such as 22, with another movable member which in turn may be engaged by the plain thrust bearing.

It is also possible to mount the clutch operating mechanism on a separate piece and to attach this piece separately on the pressure plate or on the fly wheel.

I have mentioned some of the modifications which are possible in connection with this clutch structure and which I contemplate to use in practice, in order to show the possibilities which my clutch structure has relative to being realized in other ways than the one which I have shown.

The clutch mechanism, as far as the same has been described, is completely assembled with the pressure plate 15 and forms a unitary structure. The levers are prevented from moving too far under the action of the spring 23 due to the projection on each lever, such as indicated by numeral 35 in Figure 1. The clutch mechanism including the pressure plate, the spring means and the lever can therefore be adjusted before attaching the same to a fly-wheel. The attachment in operative assembly with the fly-wheel requires merely the attachment of the abutment post on the fly-wheel, as shown.

I shall now describe in detail the means which I have provided in this clutch for adjusting the working clearances to compensate for manufacturing variations.

It will be recalled from the previous discussion that prior clutch structures do not show means whereby manufacturing variations of the individual parts may be overcome. The accurate functioning of a clutch, however, is dependent upon the parallel movement of the pressure plate during engagement and this parallel movement can only be achieved by adjusting means which take care of the manufacturing variations. This is due to the fact that it is impossible in a practical manufacturing process to produce the various parts without any variations.

The inner ends of the levers which I have designated in the drawings, Figures 1 and 2, by the reference numerals 36, 37 and 38, must be engaged by the release bearing 34 at the same time when the release bearing is moved to disengage the clutch. Again, the inner ends of the levers must all be the same distance from the fly-wheel surface so that as the throwout bearing is moved in to release the clutch, all of the levers will be contacted at the same time. As has been said previously, if this condition is fulfilled and if the levers and the abutment surfaces are reasonably true to form, and if there is no yield in the several parts, then the clutch will have a high degree of parallelism during engagement.

It will be observed that the clutch mechanism, as far as the same has been described, shows very few parts and by the very simplicity of cooperation of these parts in the assembly, a high degree of accuracy is attained. However, in order to furnish a clutch structure which may be irreproachable from the standpoint of accurate operation, I have also provided means for overcoming the drawbacks which may be due to manufacturing variations in the individual parts. It would be impossible in practice to keep the height of the three holes in the extensions of the pressure plate, where the levers are to be fulcrumed, exactly the same height when measured from the plane of the friction surface of the pressure plate. There would be certain variations in these holes, in the abutments, and also in the levers. The cumulative effect of these manufacturing variations, which have been discussed in detail previously, would make it impossible to keep the inner ends of the lever in such position that the same may be contacted by the throwout bearing 34 at the same time.

The adjustment means which I have provided is simple. The pin or stud shown in Figure 1 which fulcrums the individual lever to the extension of the pressure plate is eccentric. The pin has a larger end 39 and a smaller portion 40. The larger portion is eccentric relative to the smaller portion and takes the lever. The smaller portion is inserted into the corresponding hole in the extension of the pressure plate. The eccentricity need only be about .002".

This fulcrum or pivot pin is shown particularly in Figure 5. It will be seen that the pin has the larger diameter portion 39 and the smaller diameter portion 40, the former being eccentric relative to the latter. The end of the smaller diameter portion 40 has two flattened sides 41 and 42 and a counterdrilled hole 43. The smaller diameter portion 40 and the flattened side thereof serves two purposes. In the first place, it will be necessary to apply a wrench to the pin to rotate it to the desired angular position in order to adjust the position of the corresponding lever. The wrench may be applied to these flattened sides. The pin must then be locked in the position in which it is adjusted, and for this purpose I have provided a lock washer which is particularly shown in Figure 4. This washer, which is designated by the reference numeral 44, has a hole 45 which may engage the flattened end of the smaller diameter 40 of the pin, and a number of wings, such as 46. The lock washer may also be used as a wrench for rotating the pin into the desired position.

When the corresponding lever is in the adjusted position, the wings of the lock washer will be bent over the extension on the pressure plate, locking the pin in place, and the smaller diameter end of the pin will be riveted over, the riveting being facilitated by the counterdrilled hole in the pin.

Referring now particularly to Figure 3, it will be seen that the abutment 27 is provided with a suitable opening 47. The extension, such as 16, on the pressure plate 15 projects through the hole 47, and the lever, such as 19, projects also through this opening. The wearing surfaces of the lever react against the reaction bases in the abutment, which are indicated in Figure 3 by the reference numerals 48 and 49. The smaller diameter portion 40 of the fulcrum pin is in a ring fit in the hole in the cast lug or extension 16 on the pressure plate. The shoulder of the pin presses tightly against the pressure plate extension and with the lock washer 44 in place, the end of the smaller diameter portion of the pin is riveted over as indicated at 50 in Figure 3. The larger diameter portion 39 engages the corresponding hole in the lever 19. The legs of the lock washer are bent over, as shown at 46.

It may be repeated at this point that the eccentric throw of the pin is so small as compared with the pin diameter that there will be very little tendency for the pin to turn. This slight tendency will be resisted both by the lock washer and by the clamping of the pin between the shoulder of the larger diameter portion and the riveted over end of the eccentric pin.

It will be apparent from the above description of this embodiment that the parallelism of the clutch operation can be adjusted at the time the clutch operating mechanism is assembled. The completely assembled and preadjusted clutch operating mechanism may then be mounted on the fly-wheel and put into operation without making any adjustments at all.

This possibility of preadjusting a clutch mechanism for the parallelism of lever operation is, as far as I am aware, realized for the first time in connection with such a structure. Attention is also called to the fact that the parallelism is adjusted between the pressure plate and the levers. This is a further novel point, and use of the eccentric fulcrum pin represents another novel feature of the invention.

Many modifications can be devised following the teaching of the above described structure. For example, a screw driver slot could be provided in the large diameter portion of the eccentric pin to permit the rotation thereof, and a cast hole could be placed on the side of the lug or extension of the pressure plate so that the riveted end of the pin will press into this cast hole and act as a lock. A nut and an ordinary type lock washer could be used in place of riveting the end of the pin over, thus making an assembly that could be taken apart for service. I shall describe presently certain other modifications.

Referring now to the structure shown in Figures 6, 7 and 8, the embodiment shown in these figures illustrates a clutch structure with the feature of adjusting the parallelism of lever operation which is somewhat different from the one described previously, due to different structure of this clutch. The abutment bracket is wider and there are pairs of cast lugs extending out from the pressure plate to act in a driving capacity in connection with the sides of the rectangular holes in the abutment brackets.

The advantage of having two lugs or extensions on the pressure plate lies in the best possible fit between the lugs and the abutment brackets. In this particular structure shown in Figures 6 to 8 inclusive, one lug or extension of each pair is shorter than the other. The short lug merely extends through the corresponding bracket far enough to serve as a driving means, while the long lug extends through the abutment bracket as in the previous structure, and serves as a fulcrum mounting for the corresponding lever. A fulcrum pin having a larger diameter portion and a smaller diameter portion is again used for mounting the lever on the corresponding extension of the pressure plate. The larger portion, which is eccentric relative to the smaller portion of the pin, takes the lever and the end of the smaller portion is riveted over in order to lock the pin in place after the same has been adjusted to hold the corresponding lever in parallelism with the other levers. In the previous structure I have used a lock washer. In the structure under discussion, I provide a groove in the corresponding lug. This groove is cast in the lug across the same and in a direction so as to permit the casting to be made without a core. When the pin is riveted over, the metal flows into the groove and acts as a key for locking the pin in place. The larger diameter portion of the pin is provided with a screw driver slot in order to permit the adjustment for parallelism prior to riveting the smaller end over for the purpose of locking the pin.

It will not be necessary to furnish as detailed a description of this structure as I have furnished in connection with the previously described structure since the individual parts are known. I shall therefore mainly concentrate on the description of the differences which this structure shows over and above the previously described mechanism.

The fly-wheel is indicated by the reference numeral 55. Journaled in this fly-wheel in a bearing which is diagrammatically indicated at 56 is the driven shaft 57 which is also journaled in the bell housing 58 by means of the bearing 59. The front portion of the driven shaft 57 is splined, as indicated at 60, and supports the bushing or hub 61 which is provided with a flange. The driven plate 62 is attached to the flange of the hub 61 as previously described, and the outer portion of the driven plate 62 is provided with friction members 63 and 64. The friction member 63 may be brought into engagement with a friction surface on the fly-wheel 55 and the friction member 64 may be brought into engagement with the pressure plate 65. Mounted on extensions in the inner portion of the pressure plate, such as indicated by the reference numerals 66 and 67, is the spring 68 and the end of this spring is provided with the collar 69 which is engaged by the inner ends of the levers 70, 71 and 72. The pressure plate has cast extensions or lugs such as 73 and 74, one being longer and the other shorter. The lever is fulcrumed in each instance in the longer extension on the pressure plate. For example, the lever 70 is fulcrumed in the longer extension 73 of the pressure plate 65.

An angular abutment bracket, such as 75, cooperates with each pair of extensions such as 73—74, these extensions projecting through a hole in the abutment bracket. Each abutment bracket may be mounted on the fly-wheel by means of bolts, such as 76 and 77.

In order to adjust the parallelism of lever operation, I provide a fulcrum pin for each lever which has a larger diameter portion 78 and a smaller diameter portion 79. The larger diameter portion is provided with a screw driver slot, as shown, and holds the lever, such as 70. It will be seen, particularly from Figure 8, that the fulcrum pin extends through the longer lug 73 on the pressure plate. On the side of this lug is provided a groove which is indicated in Figure 7 by the reference numeral 80.

The adjustment is made by rotating the pin by means of the screw driver slot in the larger diameter portion 78, and when the adjustment of the corresponding lever is satisfactorily accomplished, the end of the smaller diameter portion 79 is riveted over. The metal then flows into the groove 80 on the lug such as 73 and locks the pin in the adjusted position. The riveted over end of the pin is indicated in the drawings, Figures 7 and 8, by the numeral 81.

The operation of the above described structure with reference to the Figures 6 to 8 inclusive, is substantially the same as that described in connection with the first embodiment of the invention. A separate description is not furnished in order to avoid unnecessary repetition.

In Figure 9, I have shown a fractional view of a clutch in which the adjustment for parallelism may be made by means of shims.

The fly-wheel is indicated in Figure 9 by the reference numeral 85. A driven plate 86 is provided in its outer portion with friction members 87 and 88, the first adapted to engage a friction surface on the fly-wheel, and the second provided for frictional engagement with the friction surface of the pressure plate 89. Extensions such as 90 are provided in the inner portion of the pressure plate 89 in order to mount the spring means 91 which engages the ends 92 of levers such as 93.

It will be observed that the spring 91 is mounted in this instance directly between the pressure plate and the levers, making direct contact with these parts. It is apparent, of course, that this structure may be devised if desired or required. A collar on the end of the spring may be used in accordance with the remarks made previously relative to this point.

The pressure plate 89 is provided with radially extending driving lugs such as 94, and with axially extending fulcrum lugs such as 95. The lugs 94 serve as driving means and engage corresponding holes such as 96 in the corresponding abutment brackets. The lugs 95 on the pressure plate serve for mounting the levers such as 93 in cooperative assembly with the pressure plate. Fulcrum pins such as 97 may be used for serving as a fulcrum for the corresponding lever. The fulcrum pin 97 extends through the extension 95. Each lever is provided with a slot at its end as indicated in dotted lines 98 and the slot cooperates with the fulcrum pin 97. Angular abutment brackets such as 99 are employed. Each abutment bracket is attached to the fly-wheel by means of bolts such as 100.

Each of the abutment brackets is formed to overlie the pressure plate and at the end of each abutment bracket is mounted a fulcrum lug such as 101. The lug may have a forked portion and a shaft. The forked portion may be provided with a hole, and a pin such as 102 may extend through the hole in the forked portion of the lug 101 and through a corresponding hole in the lever such as 93 for providing the reaction bases for the lever in its clutch engaging and clutch disengaging movement. The shaft portion of the lug which is indicated by the reference numeral 103 may be threaded and may extend through a corresponding hole in the abutment bracket. Shims such as 104 may be interposed between the forked portion 101 of the lug and the abutment bracket for permitting the adjustment for parallelism of the corresponding lever. The attachment of the adjustment lug 101 may be made by means of an ordinary lock washer and a nut such as shown at 105.

The arrangement which I have shown in Figure 10 is functionally and structurally similar to the one just described. The pressure plate 106 of this embodiment is again provided with radially extending driving lugs such as 107, and with axially extending fulcrum lugs such as 108. The first extend through holes in the corresponding abutment brackets such as 109, and the second serve as a means for mounting the levers such as 110. The levers may be mounted in exactly the same manner as previously described with reference to Figure 9, that is to say, each lever may be provided with a slot such as 111 and this slot may engage a fulcrum pin 112 extending through the lugs 108 on the pressure plate 106. The abutment bracket 109 may be mounted on the fly-wheel 113 by means of the bolts such as 114. The adjustment lug 114 is similar to the one shown in connection with Figure 9. It has a forked portion which is provided with a hole for taking the fulcrum pin 115 which extends through this forked portion and through a corresponding hole in the lever 110, and is provided with a threaded portion 116 which is placed through a hole in the end of the abutment bracket 109. Nuts 117 and 118 are placed on either side of the abutment bracket and when these nuts are tightened on the threaded shaft 116 of the adjustment lug, the adjustment lug will be clamped on the abutment bracket. The nuts 117 and 118 permit axial adjustment of the lug 114. By moving the lug 114 relative to the abutment bracket, by means of the nuts 117 and 118, the position of the lever 110 may be adjusted in accordance with the requirements of parallel operation of the clutch parts.

Figure 11 represents a further embodiment of the invention, showing a pressure plate 120 provided with a number of extensions such as 121 which project through holes in the corresponding abutment brackets such as 122. Each abutment bracket may be fastened to the fly-wheel 123 by means of bolts in the manner already described. A lug 124 cooperates with each extension such as 121 on the pressure plate. The lug is similar in structure to the one described in connection with the Figure 9, having a forked portion which serves as a fulcrum for the lever 125, and a threaded shaft which extends through a hole in the extension on the pressure plate. A nut 126 attached to the threaded shaft of the fulcrum lug is provided for mounting the same in place. Shims such as 127 are interposed between the extension on the pressure plate and the shoulder of the lug 124 for adjusting the relative position on the lug with respect to the pressure plate. The lever 125 is fulcrumed in the forked portion 124 of the lug by means of a pin 128. The lever 125 also extends through an opening in the abutment bracket 122 as shown, the portion 129 of the lever 125 being disposed within the opening on the abutment bracket which furnishes the reaction bases for the wearing surfaces of the lever during the clutch engaging and during the clutch disengaging movement. The adjustment for parallelism may be made by means of adding or removing shims 127 and thereby shifting the position of the fulcrum lug 124 with respect to the corresponding pressure plate extension such as 121.

In Figure 12, I have shown an embodiment which utilizes the same general arrangement as shown in Figure 11 with the difference of using a fulcrum lug which may be adjusted in its relative position by means of nuts instead of shims.

The pressure plate 130 in Figure 12 is again provided with a number of radially extending lugs or projections 131 which are integral therewith and a cast part thereof. Each of these extensions projects through a hole on the abutment bracket such as 132, each abutment bracket being mounted on the fly-wheel 133 in the manner already described. A fulcrum lug having a forked portion 134 and a threaded shaft 135 projects through a hole in the extension such as 131 on the pressure plate and is held in position by means of nuts 136 and 137 which engage the threaded shaft 135. When these nuts are tightened, they clamp the fulcrum lug in position. The adjustment can be made by shifting these nuts on the threaded shaft 135. The lever 138 is fulcrumed in the forked portion 134 of the lug by means of a pin 139. The reaction portion 140 of the lever 138 is placed in an opening on the abutment bracket 132 and the wearing surfaces cooperate with corresponding reaction bases in this opening.

Referring now to the Figures 13 and 14, I have shown in these figures an arrangement wherein the adjustment for parallelism may be made in a case employing a pressure plate having pairs of lateral extensions which are of equal length.

A portion of the pressure plate is shown and indicated by the reference numeral 145. Two cast lugs 146 and 147 extend radially from the pressure plate through an opening in an angular abutment bracket designated by the numeral 148. This abutment bracket may be attached to the fly-wheel by means of bolts such as 149 and 150. The lever 151 is fulcrumed in the extensions 146 and 147 of the pressure plate by means of an eccentric pin which is particularly shown in Figure 14.

The pin has an enlarged central portion 152 which supports the lever 151. The portion 153 of the pin extends in the assembly through the cast lug 146 as shown, and the end of this portion 153 which is provided with a counter drilled hole 154 is riveted over in order to lock the pin in place after the adjustment has been made. The lug 146 is provided with a groove, the groove extending perpendicular to the view shown in the drawing, Figure 13, and the metal of the end of the portion 153 of the pin will flow into this groove and lock the pin in place when the end is riveted over. The hole in the lug 147 is larger than the one in the lug 146 in order to give the possibility of inserting the fulcrum pin. A bushing such as 155 is inserted in this hole, around the portion 156 of the pin. This portion of the pin is also provided with a screw driver slot 157 which permits the adjustment. The pin is first inserted with the portion 153 engaging the hole in the extension 146 of the pressure plate, and the eccentric portion 152 engaging the hole in the lever 151. The bushing 155 is then inserted into the hole in the extension 147 and a screw driver may be used for rotating the pin and thereby adjusting the pin in the desired position which is necessary for the parallel action of the lever.

When this adjustment is made, the end of the portion 153 of the pin is riveted over as shown in Figure 13. The pin is locked in place and is prevented from rotating due to the groove on the side of the lug extension 146 which is engaged by the riveted over end of the pin.

Several other embodiments will suggest themselves to one experienced in the art. It will be understood, therefore, that I do not desire to be limited, in applying the invention, to the precise embodiments which I have shown and described, but that I intend to use and to exploit the invention in all such structural and functional embodiments as might fall within the scope and meaning of the claims which follow.

I claim as my invention:

1. In a clutch operating mechanism for a non-adjustable clutch, a plurality of levers, means for actuating said levers to effect clutch engagement, operating means for actuating said levers to effect clutch disengagement, and means movable only during assembly of the clutch for predetermining the operation of said levers to effect parallel operation thereof, said movable means including a deformable portion adapted to be disposed during assembly of the clutch for locking said movable means in position to permanently retain said predetermined operation of the levers.

2. A clutch mechanism comprising a driving member, a driven member adapted to be moved into frictional engagement with said driving member, a movable pressure plate for moving said driven member into frictional driving engagement with said driving member, substantially radially inwardly extending levers for actuating said pressure plate, mounting lugs on said pressure plate for said levers, fulcrum pins for securing the mounting of said levers on said lugs, a thrust bearing for actuating said levers to move said pressure plate for effecting disengagement of said clutch, each of said fulcrum pins having an eccentric portion cooperating with the corresponding lever, separate means for independently rotating each fulcrum pin to adjust the fulcrum of each lever to compensate for manufacturing variations, and means for permanently locking each fulcrum pin in adjusted position.

3. The unitary assembly of a clutch operating mechanism adapted to be attached to a driving member, comprising a pressure plate having fulcrum lugs, levers for cooperative attachment to said lugs, abutment brackets pivotally mounting said levers on the driving member, adjustable means for pivotally securing said levers on said lugs and adjustable to bring the ends of said levers to a position in the same plane prior to the attachment of said mechanism to said driving member, and means for locking said adjusting means in any adjusted position.

4. In combination with a driving member and an operating thrust member, the unitary assembly of a clutch mechanism of the coverless type and adapted for attachment to said driving member, comprising a movable pressure plate, mounting and driving lugs on said plate, a lever for each mounting lug, spring means for actuating said levers and biased between said pressure plate and the inner end of each of said levers to effect engagement of said clutch, means on said thrust member for moving the inner ends of said levers to effect disengagement of said clutch, and means for adjusting said levers to bring the inner ends thereof to the same plane prior to the attachment of said mechanism to said driving member so that when assembled said thrust member contacts simultaneously with the inner ends of all of said levers.

5. In a clutch, a pressure plate, a plurality of extensions on said plate, a lever for each extension, eccentric fulcrum means for adjustably mounting each lever on the corresponding extension, and locking means for said fulcrum means including a groove in each extension.

6. In a clutch, a pressure plate, a plurality of pairs of substantially radial extensions on said pressure plate, one extension of each pair being longer, a lever for each pair of extensions, eccentric fulcrum means for adjustably securing said lever in assembly with said longer extension of each pair, a groove in said extension, means for rotating said fulcrum means to desired position, and means including said groove for locking said fulcrum means in adjusted position.

7. In a clutch, a pressure plate, a plurality of pairs of substantially radial extensions on said pressure plate, a lever for each pair of extensions, an eccentric fulcrum pin for adjustably securing each lever in assembly with said extensions, a groove in one of said extensions, means for rotating said fulcrum pin to desired position, and means including said groove for locking said fulcrum pin in adjusted position.

8. In a coverless type of clutch, a driving member, a plurality of levers adapted to be pivotally connected with the driving member, a pressure plate, means pivotally connecting the levers with said pressure plate, spring means biased between the pressure plate and the levers and reacting against the driving member for urging said pressure plate toward said member, means for shifting certain of the pivots for said levers during manufacture of the clutch, and means for permanently fixing said adjustment during the manufacture of the clutch to retain said adjustment throughout the life of the clutch.

9. In a coverless type of clutch, a driving member, a plurality of levers pivotally connected with the driving member, a pressure plate having substantially radial extensions around the periphery thereof, means including eccentric pins pivotally connecting said levers with said extensions, spring means biased between the pressure plate and the inner ends of said levers, said eccentric pins being individually shiftable during the manufacture of the clutch to bring the inner ends of the levers to the proper position, and means for permanently fixing the eccentric pins in position to retain the adjustment thereof.

10. In combination with driving and driven members, a clutch mechanism adapted to be attached to the driving member including a plurality of levers adapted to be pivotally connected with the driving member, a pressure plate, means pivotally connecting the levers with said pressure plate, spring means reacting against said levers and said pressure plate for shifting the latter relative to the driving member when the clutch is assembled, and means for shifting certain of the pivots for said levers to place the latter in proper relative position prior to the attachment of said mechanism to said driving member.

11. In combination with driving and driven members, a clutch mechanism adapted to be attached to the driving member including a plurality of levers adapted to be pivotally connected with the driving member, a pressure plate, means pivotally connecting the levers with said pressure plate, spring means reacting against said levers and said pressure plate for shifting the latter relative to the driving member when the clutch is assembled, means for shifting certain of the pivots for said levers to place the latter in proper relative position prior to the attachment of said mechanism to said driving member, and means for permanently fixing said adjustment prior to the attachment of said clutch mechanism to the driving member.

12. A clutch comprising a driving member, a driven member, a pressure plate, lever means pivotally connected with said plate, detachable means adapted to pivotally connect said lever means with one of said members, said lever means being adapted to react against said one member for moving said pressure plate against the other of said members, spring means biased between said lever means and said pressure plate for actuating said lever means, said spring means being carried by said pressure plate and removable from said one member therewith, cooperating means serving to limit the relative movement of said lever means, pressure plate and spring means when said detachable means is disconnected from said one member, and means operative when said detachable means is disconnected for adjusting the position of said lever means.

13. A clutch comprising a driving member, a driven member, a pressure plate, lever means pivotally connected with said plate, detachable means adapted to pivotally connect said lever means with the driving member, spring means carried by and biased between said lever means and said pressure plate for actuating said lever means, means reacting against said lever means for limiting the relative movement between the lever means and the pressure plate when detached from said driving member, and means for adjusting the pivotal connection of said lever means with said pressure plate.

14. A clutch comprising a driving member, a driven member, a pressure plate, lever means pivotally connected with said plate, detachable means adapted to pivotally connect said lever means with the driving member, spring means carried by and biased between said lever means and said pressure plate for actuating said lever means, cooperative means for limiting the relative movement between the lever means and the pressure plate when detached from said driving member, and means for adjusting the connection between said detachable means and said lever means when said parts are detached from the driving member.

GEORGE I. GOODWIN.